United States Patent [19]

Nakamura et al.

[11] 3,911,371

[45] Oct. 7, 1975

[54] SIGNAL TRANSMISSION SYSTEM

[75] Inventors: Shoichi Nakamura; Noriaki Naito; Tetsuya Horichi; Yoshitaka Kanamoto, all of Tokyo, Japan

[73] Assignee: Sony Corporation, Tokyo, Japan

[22] Filed: Aug. 8, 1974

[21] Appl. No.: 495,911

Related U.S. Application Data

[63] Continuation of Ser. No. 274,667, July 24, 1972.

[30] Foreign Application Priority Data

July 24, 1971 Japan .............................. 46-55529

[52] U.S. Cl. ...................... 330/28; 330/51; 330/86; 330/109; 333/70 CR

[51] Int. Cl.[2] .......................................... H03F 1/34

[58] Field of Search ....... 330/51, 86, 107, 109, 110, 330/28; 333/14, 18 T, 28 T, 70 CR; 179/1 P; 360/67, 68

[56] References Cited

UNITED STATES PATENTS

| | | | |
|---|---|---|---|
| 2,101,688 | 12/1937 | Rechnitzer | 333/28 T |
| 2,626,991 | 1/1953 | Mountjoy et al. | 333/28 T |
| 3,178,698 | 4/1965 | Graham | 330/86 X |
| 3,568,100 | 3/1971 | Tarbox | 333/18 |
| 3,631,365 | 12/1971 | Dolby | 333/14 |
| 3,665,345 | 5/1972 | Dolby | 333/14 |
| 3,678,416 | 7/1972 | Burwen | 179/1 P X |
| 3,729,687 | 4/1973 | Orlandini et al. | 330/51 |

*Primary Examiner*—James B. Mullins
*Attorney, Agent, or Firm*—Lewis H. Eslinger; Alvin Sinderbrand

[57] ABSTRACT

A signal transmission system including a variable filter to control the frequency response by means of a control signal based on the amplitude of the information signal. The variable filter is connected to an output circuit of an information signal amplifier and may feed the frequency-modified information signal to a system output terminal, if the system is to compress the dynamic range of the information signal by amplifying low amplitude signals more than high amplitude signals. Alternatively, the filter may feed the frequency-modified signal back to the input of the amplifier by way of connecting means, such as a switch, to expand the dynamic range. In the latter mode, the switch can simultaneously be used to connect a feedback element directly between the output and the input of the amplifier. The overall response of the transmission system in expanding the dynamic range of the signal is the converse of the response of the system in compressing the dynamic range.

25 Claims, 10 Drawing Figures

SIGNAL TRANSMISSION SYSTEM

This is a continuation of application Ser. No. 274,667, filed July 24, 1972.

BACKGROUND OF THE INVENTION

1. Field of The Invention

This invention relates to a signal transmission system of a type suitable for a tape recorder or the like and, in particular, it relates to a system to suppress or eliminate noise superimposed on a signal between the recording and playback thereof.

2. The Prior Art

Electrical information signals are, as a general matter, subject to having noise signals superimposed on them as these information signals are transmitted through a system or a series of systems from the point of generation to the point of reproduction. The term "system" is used to designate any means that may affect the passage of the signals and may be simple or complex. Various techniques have been proposed heretofore to combat the effects of such noise signals and particularly to combat noise introduced by the recording medium and apparatus in the case of systems in which the signals are recorded on magnetic tape or other recording media. Such noise is not uniformly distributed throughout the information signal frequency range, and it is possible to reduce the effect of this noise by controlling the frequency response characteristics of the system. However, it is desirable to retain a proper overall frequency response characteristic for the information signal, which means that any enhancement of the signal in one part of the system should be compensated by a reduction of the signal amplitude in another part of the system.

A more sophisticated correction technique makes use of the fact that noise is particularly objectionable when the amplitude of the information signal is low and does not mask the noise. According to that technique, low amplitude signals are amplified more than high amplitude signals before the signals are allowed to be applied to part of the transmission medium where a specific type of noise is likely to be added to the signal. For example, low amplitude signals may be amplified more than high amplitude signals in a recording system and then these modified signals can be recorded on the recording medium. The reproducing system preferably amplifies the recorded signals in such a way that relatively low amplitude signals are amplified less than relatively high amplitude signals. Thus, the overall system may affect the signals uniformly by having the reproducing system compensate for the modification in signal amplitude introduced by the recording system. The advantage is that low amplitude noise signals, such as might be introduced by the recording medium itself or might be picked up by the reproducing transducer in the reproducing system, are passed through only the part of the total transmission path in which they are amplified relatively little. It has also been proposed that this technique be applied to selective portions of the frequency band of the information signal, for example, to minimize low frequency noise, such as hum, or high frequency noise, such as hiss.

It is one of the objects of the present invention to provide an improved correction technique and circuit to obtain selective reduction of low amplitude noise signals in a frequency band that depends on the amplitude of the information signals.

Further objects will become apparent from the following specification, together with the drawings.

BRIEF DESCRIPTION OF THE PRESENT INVENTION

In accordance with the present invention, an output circuit of a signal amplifier is connected to a variable filter, that is, a filter having a variable frequency response characteristic that can be changed on a dynamic basis. The amplitude of the signals from the amplifier is modified by the variable filter in accordance with the instantaneous frequency response of the filter. The filter has a frequency response that attenuates one band of frequencies relative to another, i.e., low frequency signals relative to high frequency signals, within the complete range of the information signals. In accordance with the present invention the filter is so arranged that the attenuation of signals at the low frequency end of the band is relatively constant, and the attenuation of the high frequency signals is also relatively constant, but between the low frequency and high frequency signals is a transition range in which the attenuation varies between the upper and lower limits. Furthermore, a control circuit is connected to the filter and is also connected to receive information signals to control the characteristics of the filter in such a way that the transition range can be shifted toward the high frequency end of the overall band or toward the low frequency end, depending on the amplitude of the information signals.

When this system is to be used to record the information signals on a recording medium, such as magnetic tape, signals that have passed through the amplifier and the variable filter are made available at a system output circuit, such as a recording transducer. A negative feedback circuit may be connected from an output circuit to an input circuit of the amplifier when the system is part of a recorder.

On the other hand, if the amplifier and variable filter with its control circuit are to be used in a reproducing system, the output of the variable filter is connected back to an input circuit of the amplifier so that the variable filter is part of a negative feedback loop. In that case the signals that are more attenuated by the filter, will provide less negative feedback for the amplifier and thus will result in a higher output amplitude in the output circuit of the amplifier than those signals that are attenuated less by the filter. The output circuit of the amplifier arranged in this manner may then be connected to a loud speaker or any other desired further circuit or load.

These circuit components can be incorporated into a single device, such as a device for recording signals on tape and playing such signals back. If the circuit is to be used both in recording and in reproducing, a switch is connected between the output of the filter and an input circuit of the amplifier. When this switch is closed, the signals from the filter are fed back to the amplifier; when it is open, these signals are not fed back to the input of the amplifier but may be applied to a recording head. It is also advantageous to incorporate an additional feedback element in the feedback loop and attach this element to the feedback input circuit of the amplifier. By making the switch a single-pole-double-throw switch and connecting the arm to the feedback element, one of the fixed terminals to the output of the amplifier, and the other fixed terminal to the output of the filter, the switch may be actuated in one direction to connect the feedback element directly to the output of the amplifier when signals are to be recorded, and in the other direction to connect the feedback element to the output of the filter when signals are to be reproduced. Further switching means may be used to connect a microphone to an input circuit of the amplifier when the apparatus is to be used to record signals or to connect a playback transducer to the input circuit of the amplifier when the apparatus is to be used for playing back previously recorded signals. Additional switching means can disconnect the loudspeaker load from the output circuit of the amplifier and connect a recording transducer to the output of the filter when the apparatus is to be used to record signals.

In particular, for reducing hiss generated by magnetic tape in a tape recorder, the variable filter is arranged so that when the information signal is in the high frequency portion of the overall band and at the same time has a relatively low amplitude, it will be amplified more than another signal of equal amplitude at the low frequency end of the overall frequency band. At an intermediate range of frequencies, the amplification will be dependent upon the precise frequency and will be between the maximum amplification of the high frequency signals and the minimum amplification of the low frequency signals. As the incoming signal increases in level, the transition band shifts so that the amplification of signals within the transition band will be reduced. In a reproducing system according to the present invention, the amplification of a high frequency, low level signal will be less than the amplification of a low frequency, low level signal. The transition band will be the same as in the recording system so that the amplification of signals within that band will be the converse of the amplification in the recording system. Thus, the use of the same components for both recording and reproduction produces equal and opposite effects on the information signals.

DETAILED DESCRIPTION OF THE INVENTION

Figures 1, 2, 3A, 3B, 3C, 3D:
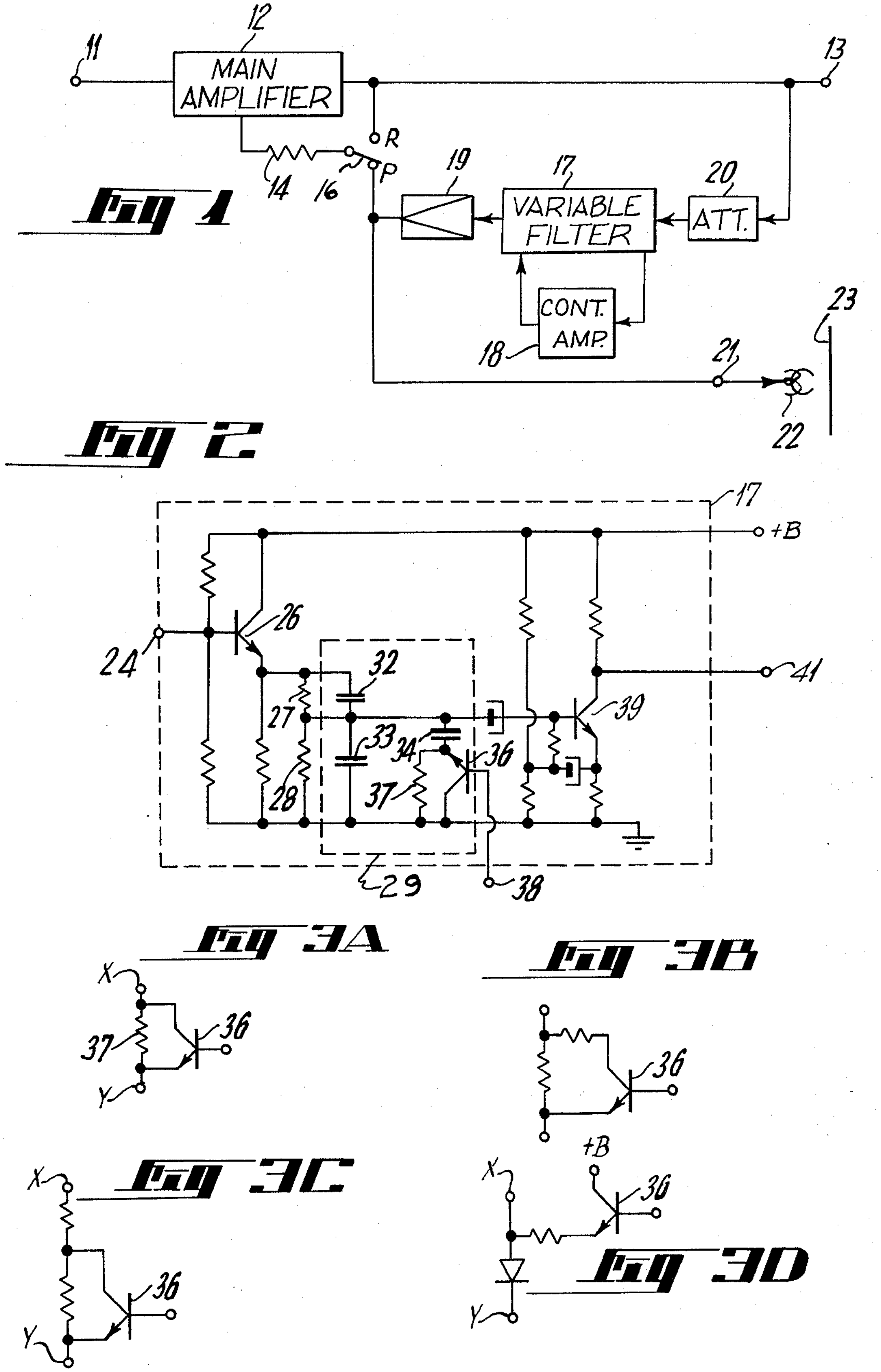
FIG. 1 is a block diagram of a signal transmission system according to the present invention.
FIG. 2 is a schematic diagram of the variable filter in FIG. 1.
FIG. 3A – FIG. 3D are schematic diagrams of circuits suitable for use as the variable impedance component of the filter in FIG. 2.

FIG. 1 shows a signal transmission system which is capable of reducing the effect of certain noise signals on an information signal. The system shown in FIG. 1 can be used either in the section of the signal path that preceeds the introduction of the noise to be minimized or in the part of the signal path that follows the introduction of such noise.

The circuit in FIG. 1 includes an input terminal 11 connected to the input circuit of the main amplifier 12 which has an output circuit connected to an output terminal 13. A feedback element 14 is also connected to an input circuit of the amplifier 12. This may be the same input circuit as that connected to the terminal 11 or it may be another part of the input section of the main amplifier 12. The feedback element 14, which is here shown as a resistor, is connected to the arm of a switch 16 that has two stationary poles identified by the letters R and P corresponding to the fact that when the circuit is to be used to record information signals on magnetic tape, the switch arm will be in connection with the R terminal and when the circuit is to be used to play back signals previously recorded on a magnetic tape, the arm of the switch 16 will be in contact with the terminal P, which is the position shown in FIG. 1.

A variable filter 17 is connected to the terminal 13 to receive the output signals of the main amplifier 12. The variable filter will be described in detail hereinafter and at the moment it is sufficient to note that the frequency-response characteristics of the variable filter are dynamically controlled by a control amplifier 18. The output of the variable filter 17 is applied to a compensating amplifier 19, the gain of which may be set to compensate for the attenuation of an attenuator 20 and the filter 17. The output of the compensating amplifier 19 is connected to the terminal P of the switch 16 and is also connected to a system output terminal 21 which in turn is connected, in the present embodiment, to a magnetic recording head, or transducer, 22. This transducer is located in position to record information on magnetic tape 23, only a short length of which is shown in the drawing.

The circuit shown in FIG. 2 is the variable filter 17 of FIG. 1 and includes an input terminal 24 connected to the base of a first transistor 26 which is connected as an emitter-follower to provide a low output impedance. Resistors 27 and 28 are connected as a voltage divider between the emitter of the transistor 26 and ground to compensate the filter characteristics, particularly in the low frequency part of the band. The actual filtering elements are included within a subcircuit 29 and comprise a pair of capacitors 32 and 33 connected in parallel with the resistors 27 and 28 as a voltage divider. In addition, the filtering elements include a third capacitor 34, one terminal of which is connected to the junction between the capacitors 32 and 33, and the other terminal of which is connected to the emitter of a transistor 36, the collector of which is connected to ground. The emitter-collector circuit of the transistor 36 is in parallel with a resistor 37 and the base of the transistor 36 is connected to a control signal input terminal 38. The maximum impedance between capacitor 34 and ground, in case transistor 36 reaches cutoff, is limited by the resistor 37 to maintain the desired two-level response characteristics shown in FIG. 4.

The subcircuit 29 is connected to the base of a transistor 39 that has a relatively high input impedance. The output signal of the variable filter circuit 17 is derived from a terminal 41 connected to the collector of the transistor 39.

The subcircuit 29, together with the resistors 27 and 28, is a high pass filter. The frequency-response of this filter is varied by the impedance presented by the emitter-collector circuit of the transistor 36 and this in turn is controlled by the amplitude of the control signal applied to the terminal 38. For low amplitude control signals that only drive the base of the transistor 36 slightly above ground voltage, the transistor has relatively low conductivity. As the amplitude of the control signals applied to the terminal 38 increases, the transistor 36 becomes more conductive.

FIG. 3A–3D are alternative circuits for the transistor 36 and resistor 37 in FIG. 2, although the circuit in FIG. 2 is the preferred embodiment to minimize distortion and to obtain the best transient characteristic. The circuits in FIGS. 3A–3D may be substituted in FIG. 2 by removing the transistor 36 and resistor 37 shown there and the connecting terminal X, to the capacitor 34 and the terminal Y to ground.

Figure 4:
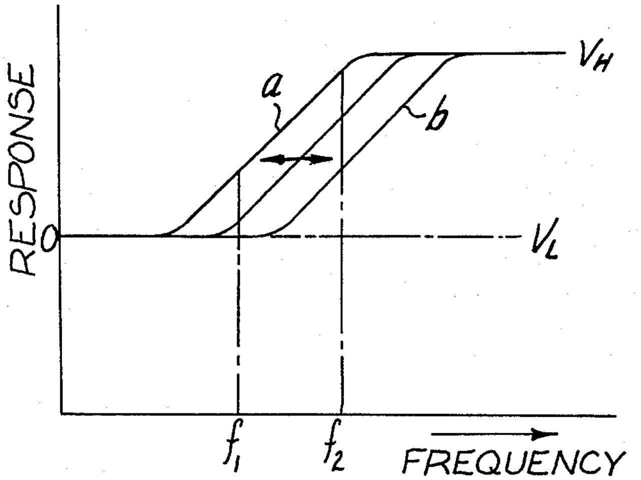
FIG. 4 is a frequency-response curve of the signal transmission system of FIG. 1 when used as a recorder.

The frequency-response of the filter 17 is basically illustrated by the response curve shown in FIG. 4. The upper level $V_H$, which is the output voltage, is related to the input voltage, which may be designated as $e_{in}$, by the equation $$V_H = \frac{Z_{33}}{Z_{32}+Z_{33}} e_{in}$$

wherein $Z_{32}$ and $Z_{33}$ are the impedances of the condensers 32 and 33, respectively. This equation indicates that the capacitors 32 and 33 are simply acting as a voltage divider in establishing the upper voltage $V_H$. On the other hand, the relationship of the lower level voltage $V_L$ to the input voltage $e_{in}$, is given by the equation $$V_L = \frac{Z_{33} \parallel Z_{34}}{Z_{32} + Z_{33} \parallel Z_{34}} e_{in}$$

where the symbol $V_{33} \parallel Z_{34}$ indicates the impedance of the parallel connection of the capacitors 33 and 34.

The cutoff frequencies $f_L$ and $f_H$ where the sloping parts of the curves in FIG. 4 intersect the voltage levels $V_L$ and $V_H$, respectively, are given by the equations $$f_L \approx \frac{1}{2\pi\, C_{34}\, Z_{36}}$$

$$f_H \approx \frac{1}{2\pi (C_{32} + C_{33})\, Z_{36}}$$

where $C_{32}$, $C_{33}$, and $C_{34}$ are the capacitances of the capacitors 32, 33, and 34, respectively, and the symbol $Z_{36}$ is the output impedance of the transistor 36. Accordingly, the cutoff frequencies $f_L$ and $f_H$ may be varied by controlling the impedance $Z_{36}$ to move the sloping line in FIG. 4 from the position *a* to the position *b*. The curve *a* is the response curve when the level of the signal applied to the input terminal 38 is small and therefore the impedance $Z_{36}$ is large. The response curve follows the sloping line *b* when the input voltage applied to the terminal 38 is large and therefore the impedance $Z_{36}$ is small. At intermediate signal levels, the response curve is between the curves *a* and *b*. It is important that changing the impedance $Z_{36}$ does not change the voltage levels $V_H$ and $V_L$ but only varies the location of the transition band between the frequencies $f_L$ and $f_H$.

The response of the filter is specifically indicated for two frequencies $f_1$ and $f_2$ within the transition band. The frequency $f_1$ is lower than the frequency $f_2$ and the response is always lower for the frequency $f_1$ than it is for the frequency $f_2$. However, the exact response at each of these frequencies depends on whether the level of the voltage applied to the terminal 38 is relatively high or low. For high input voltages to the terminal 38, the response at the frequency $f_1$ is at the lower level $V_L$.

The frequency-response curves in FIG. 4 are also representative of the overall frequency-response characteristic of the circuit when it is being used to record signals on the tape 23. In this case the arm of the switch 16 is thrown into contact with the terminal R and the output voltage of the amplifier 12 is simply modified by the frequency characteristic of the variable filter 17.

Figure 5:
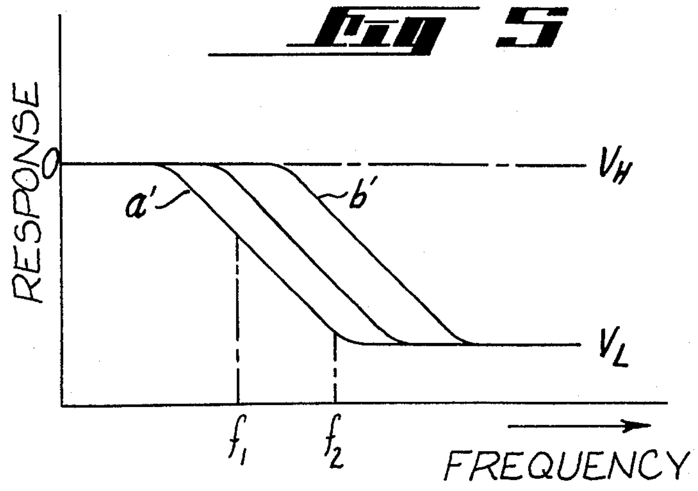
FIG. 5 is a frequency-response curve of the system of FIG. 1 when used as a reproducer.

On the other hand when the circuit is to be used to reproduce previously recorded signals, the terminal 11 receives the incoming signal from a magnetic pickup head, and the switch 16 is placed so that the arm is in the position shown in FIG. 1 in contact with the terminal P. The entire feedback loop for the amplifier 12 then includes not only the resistor 14 but the variable filter 17 along with the compensating amplifier 19 and the attenuator 20. When the voltage fed back to the input circuit of the amplifier 12 is large, the output voltage is relatively small. Conversely, when the voltage fed back is relatively small, the output voltage is relatively large. Since the magnitude of the voltage fed back is determined by the frequency characteristics of the variable filter 17, the output voltage of the amplifier 12 in the playback mode of operation and measured at the terminal 13, will be as shown in FIG. 5, which is the converse of FIG. 4. In both FIGS. 4 and 5 the effect of a large input voltage to the terminal 38 in FIG. 2 is to shift the transition part of the curve to the right, i.e., to the line *b* in FIG. 4 and to the line *b'* in FIG. 5. Thus the recording and playback modes are compensated on a dynamic basis.

Figure 6:
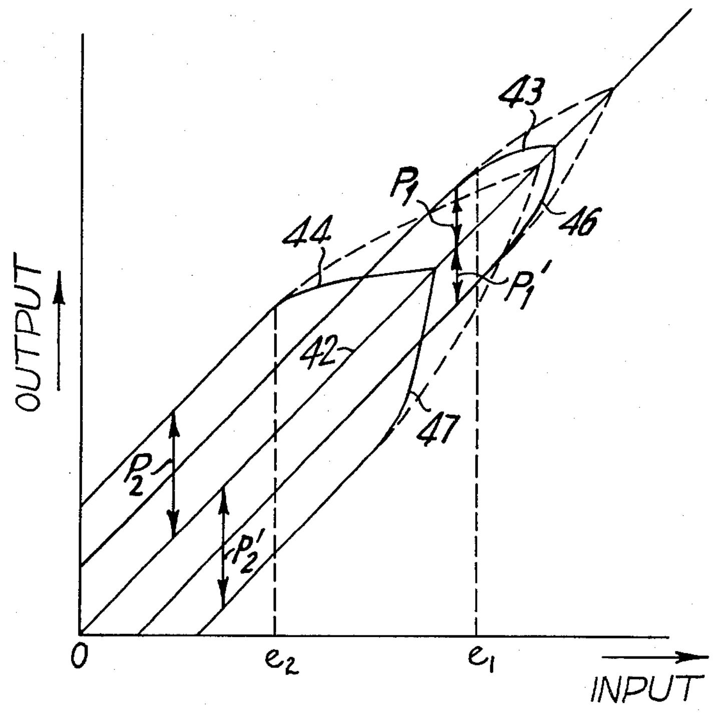
FIG. 6 is a graphical presentation of the input-output characteristics of the signal transmission system in FIG. 1.

FIG. 6 shows the relationship between the output and input of the information signals applied to the circuit of FIG. 1 for both modes of operation. The overall response, including both the recording and playback, is linear, which means that the amplitude of the output signal is a direct function of the amplitude of the input signal. This relationship is indicated by the line 42 in FIG. 6. The characteristics of the circuit of FIG. 1 operating as a recording system are indicated by the typical curves 43 and 44 above the line 42, and the matching curves 46 and 47 below the line 42, indicate the operation as a reproducer.

The overall frequency-response between the input terminal 11 in FIG. 1 and the system output terminal 21 presents the high-frequency band enhancing characteristic. As shown in FIG. 4, the cutoff frequency is raised as the level of the input signal increases. The result, as shown in FIG. 6, is that when the input signal level is small, the amplification of the system is raised by the amount $P_1$ over the original curve 42 and follows the curve 43. When the input signal level exceeds a point $e_1$, attenuation is initiated so that the response curve 43 approaches the original response characteristic 42. This is due to the fact that the transition band of the variable filter 17 shifts toward the position *b* as shown in FIG. 4. This description corresponds to the case in which the information signal has a very low level and a frequency $f_1$as indicated in FIG. 4.

However, for a higher frequency $f_2$ located substantially at the middle of the transition curve in FIG. 4, a higher level signal can be obtained as indicated by the curve 44. In this case the system has a higher gain $P_2$ than the gain $P_1$ for the lower frequency signal. The main amplifier 12 controls the variable filter 17 to cause the signal having the frequency $f_2$ to be amplified more than the signal having the frequency $f_1$, and control of the variable filter 17 is initiated at a lower level $e_2$ than the input signal level $e_1$. As a result the curve 44 starts to approach the characteristic curve 42 at a lower level. Thus the low amplitude, high frequency signal is amplified more than a lower frequency signal of the same level. The operation of the system in FIG. 1 as a reproducer is exactly the converse, as illustrated by the fact that the curves 46 and 47 are symmetrical with respect to the curves 43 and 44. This causes the higher frequency signal to be suppressed more in reproduction than a lower frequency signal. Thus it is possible for the signal-to-noise ratio to be improved by the reduction of high frequency hiss and the like.

Figure 7:
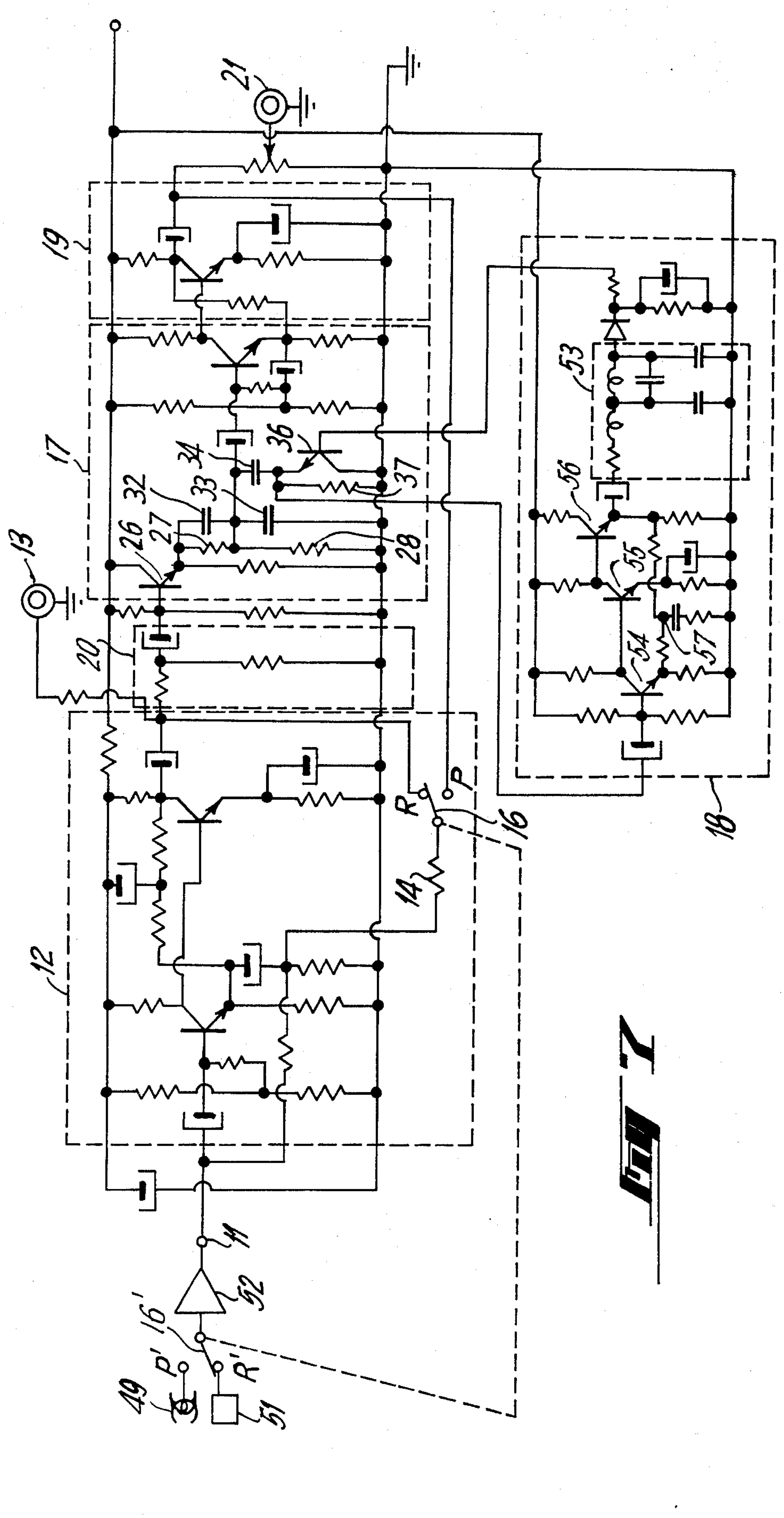
FIG. 7 is a schematic diagram of one embodiment of the system in FIG. 1.

FIG. 7 is a schematic circuit with the components of the block diagram of FIG. 1 indicated by corresponding reference numerals. In addition, the circuit in FIG. 7 includes a magnetic pickup head 49 connected to a terminal p' of a second part of the switch 16. This pickup head is used when the circuit is used as a reproducing system. The circuit also includes a microphone connected to a terminal R' to be utilized when the circuit is operated as a recording system. The arm of the switch 16' is connected to an amplifier 52 that supplies signals of the necessary amplitude to the input terminal 11. The input of the control amplifier 18 is shown as being connected directly to the emitter of the transistor 36, which is, in effect, one of the output terminals of the filter circuit. The control amplifier 18 connected in this way shifts the operation of the circuit to the dotted lines in FIG. 6, as is desired. The control amplifier 18 includes three transistor stages 54 to 56, the last of which is connected as an emitter-follower to supply signals to a band elimination filter 53. The purpose of this filter is to eliminate specific signals such as the 19KHZ pilot frequency used in FM multiplex operation. A low-pass filter 57 connects the output of stage 56 to stage 54 to boost high-frequency response. The output of filter 53 is rectified and connected to the base of transistor 36. The remainder of the circuit is similar to that shown in FIG. 1 and the explanation of its operation need not be repeated.

What is claimed is:

1. A signal processing system comprising:

A. an amplifier comprising input and output circuits;

B. a variable filter connected to an output circuit of said amplifier to receive information signals therefrom and to filter said signals, the frequency response of said filter having a first substantially flat level in a first frequency range above a first frequency and a second substantially flat level in a second frequency range below a second frequency, said second frequency being lower than said first frequency and said second level being different from said first level, the frequency response between said first and second frequencies being between said first and second substantially flat levels, said filter comprising a variable impedance;

C. means to vary said impedance in response to the amplitude of at least a portion of said signals to shift said first and second frequencies in a predetermined manner; and D. means to connect said filter to form a feedback loop for said amplifier to feed back information signals filtered in said variable filter to control the gain of said amplifier inversely with respect to the frequency response of said filter.

2. The signal processing system of claim 1 in which said means to form a feedback loop comprises a switch.

3. The signal processing system of claim 2 in which said switch comprises:

A. a movable arm connected to a feedback signal input circuit of said amplifier;

B. a first fixed terminal connected to said filter to receive said filtered signals; and C. a second fixed terminal connected to an output circuit of said amplifier, whereby said feedback signal input circuit can be switched into connection with either said output circuit of said amplifier, directly, to form a first feedback loop or to said filter to form a second feedback loop.

4. The signal processing system of claim 3 in which said output circuit of said amplifier is a system output circuit when said movable arm is in contact with said first fixed terminal, and said system comprises a second system output circuit connected to said filter to obtain filtered signals therefrom when said movable arm is in contact with said second fixed terminal.

5. The signal processing system of claim 4 in which said information signals are processed for recording when said movable arm is in contact with said second fixed terminal and said information signals are processed for playback when said movable arm is in contact with said first fixed terminal.

6. The signal processing system of claim 1 comprising amplitude control means connected in cascade with said variable filter between said output circuit of said amplifier and said means to form a feedback loop for said amplifier, said cascade circuit having substantially unity gain in a selected frequency band.

7. The signal processing system of claim 6 in which said amplitude control means comprises a compensating amplifier and an attenuater.

8. The signal processing system of claim 1 comprising, in addition, a feedback element connected between an input circuit of said amplifier and said means to connect said filter to form a feedback loop for said amplifier.

9. The signal processing system of claim 8 in which said means to connect said filter to form a feedback loop comprises switching means connected to said feedback element, to an output circuit of said amplifier, and to an output circuit of said filter, said switching means being actuable to connect either said last-named output circuit of said amplifier or said output circuit of said filter to said feedback element.

10. The signal processing system of claim 9 comprising, in addition, a cascade circuit of controllable gain connected in series with said filter and comprising a compensating amplifier, whereby the gain of said first-named amplifier is substantially the same within a predetermined frequency band no matter whether said switching means connects said last-named output circuit of said first-named amplifier or said output circuit of said filter to said feedback element.

11. A variable filter comprising:

A. a pair of input terminals;

B. first and second capacitors connected in a first series circuit across said input terminals;

C. a third capacitor and a controllable impedance connected in series therewith to form a second series circuit, said second series circuit being connected in parallel with said second capacitor; and D. a pair of output terminals connected to the ends of said second series circuit.

12. The variable filter circuit of claim 11 in which said variable impedance circuit comprises a transistor having its emitter-collector circuit connected in series with said third capacitor to serve as said variable impedance.

13. The variable filter of claim 11 comprising, in addition:

A. a transistor;

B. an emitter-impedance load connected between the emitter of said transistor and a fixed potential source, whereby said transistor acts as an emitter follower, said first and second capacitors being connected in series across said emitter load;

C. a second transistor having its base and emitter electrodes connected to said output terminals; and D. a control amplifier having an input terminal connected to the junction between said third capacitor and said controllable impedance circuit and an output terminal connected to said controllable impedance circuit to vary the impedance thereof in accordance with the amplitude of the signal thereacross.

14. The variable filter of claim 13 in which said controllable impedance circuit comprises the emitter-collector circuit of a further transistor.

15. The variable filter of claim 14 in which said controllable impedance comprises a first resistor connected in parallel with said emitter-collector circuit.

16. The variable filter of claim 15 comprising, in addition, a second resistor connected in series with the parallel-connected first resistor and emitter-collector circuit.

17. The variable filter circuit of claim 14 comprising, in addition:

A. a first resistor connected in series with said emitter-collector circuit; and B. a second resistor connected in parallel with the series-connected first resistor and emitter-collector circuit.

18. The variable filter circuit of claim 13 in which said controllable impedance circuit comprises:

A. a diode connected in series with said third capacitor; and

B. the emitter-collector circuit of a further transistor connected in series between a source of operating voltage and said diode and polarized to be conductive with said diode.

19. The variable filter of claim 14 in which said controllable impedance is inversely proportional to the voltage thereacross.

20. A signal processing system comprising:

A. a system input circuit to which input signals to be processed are applied;

B. a first system output circuit to have connected thereto a utilization device to be energized by processed signals;

C. means to produce processed signals from said input *s*, said means linking said input circuit to said output and comprising:

1. a filter having a frequency response that has a first substantially flat level in a first frequency range above a first frequency and a second substantially flat level in a second frequency range below a second frequency, said second frequency being lower than said first frequency and said second level being different from said first level, the frequency response between said first and second frequencies being between said first and second substantially flat levels, said filter comprising a variable impedance, 2. means to vary said impedance in response to the amplitude of at least a portion of said input signals to shift said first and second frequencies simultaneously while maintaining said levels substantially constant, and 3. an amplifier comprising:

a. an input section connected to said system input circuit to receive said signals to be processed, b. an output section connected to said filter to supply signals thereto, and c. a feedback circuit; and D. switching means to connect either said output section or the output of said filter to said feedback circuit to control the gain of said amplifier, said output section of said amplifier comprising a second system output circuit, signals from which have a frequency response that is inversely proportional to the frequency response of signals from said first system output circuit when said switching means connects said output of the filter to said feedback circuit, said means to produce processed signals comprising the only signal path by which said signals can reach said first and second system output circuits.

21. A signal processing system comprising:

A. a system input circuit to which input signals to be processed are applied;

B. a system output circuit to have connected thereto a utilization device to be energized by processed signals;

C. means to produce processed signals from said input signals, said means comprising the only signal path linking said input circuit to said output circuit and comprising a filter having a frequency response that has a first substantially flat level in a first frequency range above a first frequency and a second substantially flat level in a second frequency range below a second frequency, said second frequency being lower than said first frequency and said second level being different from said first level, the frequency response between said first and second frequencies being between said first and second substantially flat levels, said filter comprising a variable impedance; and D. means to vary said impedance in response to the amplitude of at least a portion of said input signals to shift said first and second frequencies simultaneously while maintaining said levels substantially constant.

22. The signal processing system of claim 21 in which said variable filter comprises a control amplifier connected to an output circuit of said variable filter to control the frequency response of said filter in response to the amplitude of filtered information signals.

23. The signal processing system of claim 21 in which said variable filter comprises:

A. a pair of input terminals;

B. first and second capacitors connected in series across said input terminals as a voltage divider for said information signal;

C. a pair of output terminals, said second capacitor being connected across said output terminals; and D. a third capacitor and a controllable impedance device connected in series with each other and in parallel with said second capacitor across said output terminals.

24. The signal processing system of claim 21 in which said means to vary said impedance comprises a control circuit comprising a rectifier to produce a rectified signal, said rectifier being connected to said variable impedance to control said impedance in accordance with the magnitude of said rectified signal.

25. The signal processing system of claim 24 comprising, in addition, a band elimination filter connected at a point in said system between said input circuit and said rectifier to eliminate an undesired band from said information signals, whereby said frequency response of said variable filter is varied by a control signal that excludes the undesired band.

* * * * *